(12) United States Patent
Meyer et al.

(10) Patent No.: US 11,120,202 B2
(45) Date of Patent: *Sep. 14, 2021

(54) EMBEDDED MEETING EXTENSIONS

(71) Applicant: Microsoft Technology Licensing, LLC, Redmond, WA (US)

(72) Inventors: Robert Meyer, Seattle, WA (US); Jackson Robert Thompson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,369

(22) Filed: Jun. 3, 2019

(65) Prior Publication Data

US 2019/0286690 A1    Sep. 19, 2019

Related U.S. Application Data

(63) Continuation of application No. 15/455,816, filed on Mar. 10, 2017, now Pat. No. 10,346,530.

(51) Int. Cl.
*G06F 17/00* (2019.01)
*G06F 40/169* (2020.01)
(Continued)

(52) U.S. Cl.
CPC .......... *G06F 40/169* (2020.01); *G06F 40/205* (2020.01); *G06Q 10/10* (2013.01);
(Continued)

(58) Field of Classification Search
CPC .... G06F 40/169; G06F 40/205; G06F 3/0484; G06F 17/241; G06F 40/166;
(Continued)

(56) References Cited

U.S. PATENT DOCUMENTS

2008/0195454 A1* 8/2008 Lee .................. G06Q 10/10
705/7.18
2009/0100332 A1* 4/2009 Kanjilal .............. G06Q 10/109
715/235
(Continued)

FOREIGN PATENT DOCUMENTS

| CN | 103778526 A | 5/2014 |
| CN | 104657846 A | 5/2015 |
| CN | 106168950 A | 11/2016 |

OTHER PUBLICATIONS

"Office Action Issued in European Patent Application No. 18712400. 3", dated Sep. 4, 2020, 4 Pages.
(Continued)

*Primary Examiner* — Manglesh M Patel
(74) *Attorney, Agent, or Firm* — Merchant & Gould P.C.

(57) ABSTRACT

Embeddable extensions of the functionality of email and calendaring applications are described herein. An originating email and calendaring application formats meeting items to include extensible content, e.g., within the body field of the meeting item. Recipient email and calendaring applications receive the meeting items and, depending on whether they are configured to provide an extended functionality, will either deploy the extensible content item according to the extended functionality or present the extensible content item according to a standardized functionality. The body field includes the extensible content item according to the standardized functionality that is interpretable by configured clients to provide the extended functionality.

20 Claims, 10 Drawing Sheets

(51) Int. Cl.
  *H04L 29/08* (2006.01)
  *H04L 12/58* (2006.01)
  *G06Q 10/10* (2012.01)
  *H04L 29/06* (2006.01)
  *H04L 12/18* (2006.01)
  *G06F 40/205* (2020.01)

(52) U.S. Cl.
  CPC ......... *G06Q 10/107* (2013.01); *G06Q 10/109* (2013.01); *G06Q 10/1095* (2013.01); *H04L 12/1818* (2013.01); *H04L 51/046* (2013.01); *H04L 51/08* (2013.01); *H04L 51/18* (2013.01); *H04L 63/08* (2013.01); *H04L 67/02* (2013.01); *H04L 67/141* (2013.01)

(58) Field of Classification Search
  CPC ............... G06Q 10/107; G06Q 10/109; G06Q 10/1095; H04L 12/1818; H04L 51/046; H04L 51/08; H04L 51/18; H04L 63/08; H04L 67/02; H04L 67/141
  USPC .................................. 715/234, 230, 209, 208
  See application file for complete search history.

(56) References Cited

U.S. PATENT DOCUMENTS

| | | | |
|---|---|---|---|
| 2011/0125545 A1* | 5/2011 | Lehmann | G06Q 10/109 705/7.24 |
| 2011/0137929 A1* | 6/2011 | Lehmann | G06Q 10/109 707/769 |
| 2013/0246963 A1* | 9/2013 | Siu | G06F 3/0484 715/776 |
| 2018/0032958 A1* | 2/2018 | Kanjilal | G06Q 10/109 |
| 2019/0251513 A1* | 8/2019 | Kanjilal | G06Q 10/107 |

OTHER PUBLICATIONS

"First Office Action and Search Report Issued in Chinese Patent Application No. 201880017109.2", dated Feb. 10, 2021, 12 Pages.

* cited by examiner

EMBEDDED MEETING EXTENSIONS

CROSS REFERENCE TO RELATED APPLICATIONS

This application is a continuation of U.S. patent application Ser. No. 15/455,816, filed Mar. 10, 2017, now U.S. Pat. No. 10,346,530, the disclosure of which is incorporated by reference herein in its entirety.

BACKGROUND

Email and calendaring applications provide users with the ability to schedule meetings and share communications, including attached documents, with one another. As users may employ several different applications to schedule meetings and stay on task, developers need to be mindful of the various standards used by the applications so that communications between users with different calendar and email applications are mutually interpretable.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable memory storage devices embodying processor executable instructions that provide for embeddable extensions of the functionality of email and calendaring applications are described herein. According to aspects, email and calendaring applications format meeting items to include extensible content within the body field of the meeting item. Recipient email and calendaring applications receive the meeting items and, depending on whether they are configured to provide an extended functionality, will either deploy the extensible content item according to the extended functionality or present the extensible content item according to a standardized functionality. The body field includes the extensible content item according to the standardized functionality as a hyperlink that is interpretable by configured clients to provide the extended functionality.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
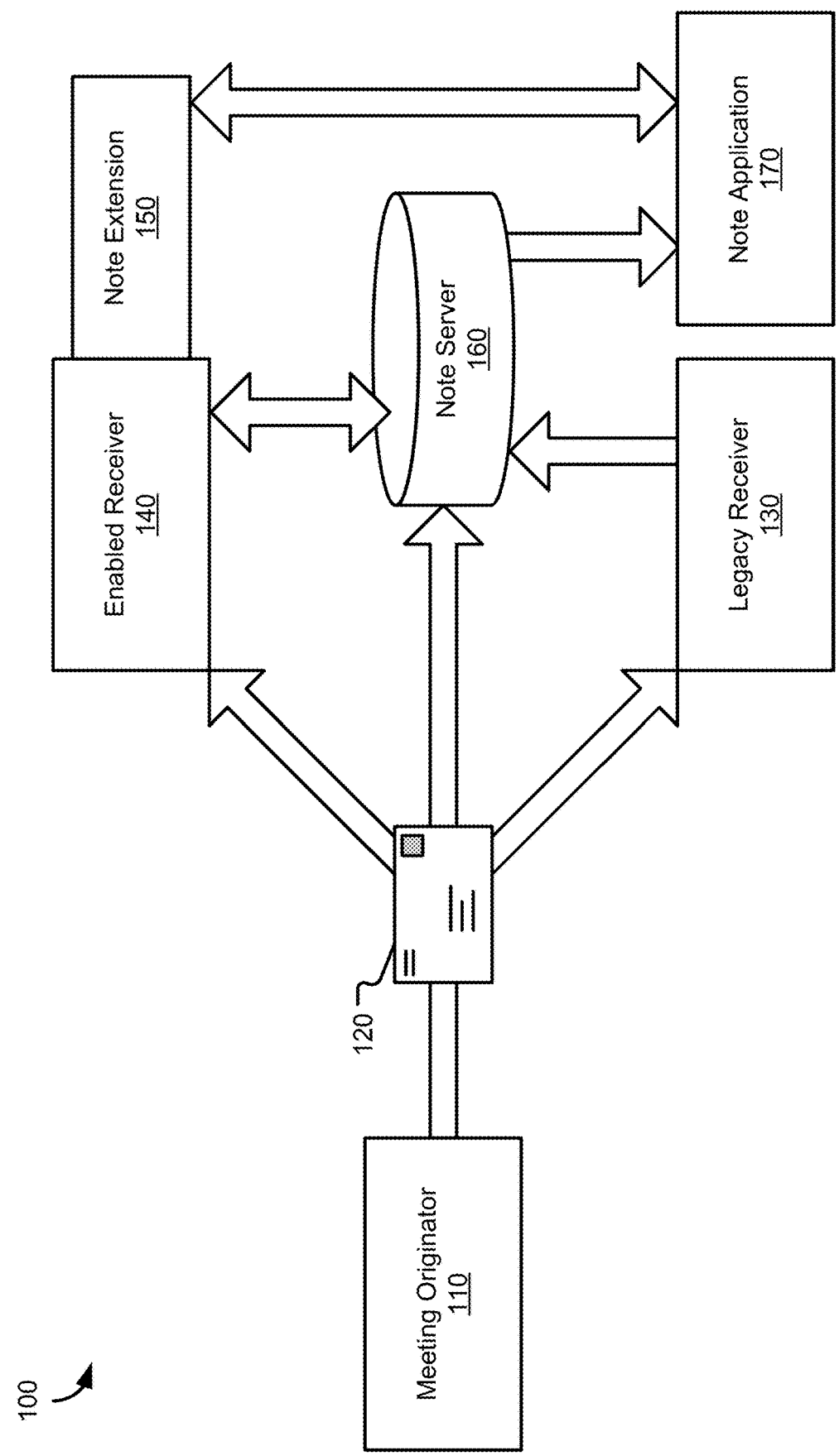
FIG. 1 is a block diagram illustrating an example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 illustrates an example operating environment 100 in which the present disclosure may be practiced. As illustrated, a sender uses a meeting originator 110 to transmit a meeting request 120 to various recipients, for example, as a meeting item via an email and calendaring application. The meeting request 120 includes a note object for access by the recipients, which behaves differently depending on the functionality of the client used to access the meeting request 120. For example, a first recipient who uses a legacy client 130 to access the meeting request 120 will see instructions for how to access the note object, e.g., a hyperlink, whereas a second recipient who uses an enabled client 140 to access the meeting request 120 and is enabled to access and edit the note object from within the enabled client 140 via a note extension 150. The note object of the meeting request 120 is hosted on a note server 160 that is accessed by the recipients via a note application 170, enabling the participants in a meeting to collaborate via the meeting request 120.

The meeting originator 110, legacy client 130, enabled client 140, note server 160, and note application 170 are provided by computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5-7. Various servers and intermediaries familiar to those of ordinary skill in the art may lie between the component systems illustrated in FIG. 1 to route the communications between those systems, which are not illustrated so as not to distract from the novel aspects of the present disclosure.

The note application 170 includes one or more authoring applications, such as, for example, word processors, spreadsheet applications, presentation applications, note taking applications, drawing applications, sound recording applications, video recording applications, etc. Additionally, the note application 170 includes locally executed "thick client" applications as well as remotely executed "thin client" applications provided as a cloud-based software service.

The meeting originator 110, legacy client 130, and enabled client 140 are illustrative of a multitude of calendaring applications, which may include email functionality. A given recipient may use one or more calendaring applications, some of which may be legacy clients 130 (e.g., on a personal device) and some of which may be enabled clients 140 (e.g., on a work device), and a sender does not need to know which calendaring application the recipient will use to access the meeting invitation 120. To enable both legacy clients 130 and enabled clients 140 to access the same note object to the fullest extent that either client can, the meeting originator 110 uses the body field of the meeting invitation 120 to include a reference to the note object that is separately interpretable by legacy clients 130 and enabled clients 140. Legacy clients 130 will interpret the body field as providing a hyperlink to the note object, by which the recipient may access the note object. Enabled clients 140 will interpret the body field as providing an embedded extension to access the note object within the enabled clients 140.

As will be appreciated, an enabled client 140 may be configured to act as a legacy client 130 (i.e., providing a hyperlink instead of or in addition to the embedded extension) due to security features (e.g., lacking a valid login or security context to access the note object), personal preferences of the recipient, or the given enabled client 140 lacking functionality to manipulate a given file type of the note object (e.g., a given client may be a legacy client 130 for some file types and an enabled client 140 for others).

The meeting request 120 is formatted with various fields that are interpretable by calendaring applications to share meeting invitations among various persons according to a known format. In various aspects, the meeting request 120 is formatted according to the Hypertext Markup Language (HTML), and the various fields are parsed out by the calendaring clients via tags defining the various fields and their values. Such fields include invitee names, meeting titles, locations, start/end times, classifiers for recurrence, a body, etc. The body field accepts freeform text entry, often to provide a description of the meeting associated with the meeting request 120, as well as other objects (e.g., images) that are embedded into meeting request 120 and interpretable via its format (e.g., as HTML anchors to referenced objects). According to other aspects, the calendaring servers may communicate with clients over a variety of other protocols (e.g., JSON, ICS, etc.).

By including a key value in the body section, the meeting originator 110 alerts enabled clients 140 to additional functionalities included in the meeting request 120 for collaborating on the note object, while legacy clients 130 (which are incapable of providing the additional functionalities) are enabled to provide a link to access the note object. For example, as is shown below in CODE 1, a division name may include a key value and contents for a link to a note object on the note server 160. The contents of the division enable legacy clients 130 to provide a hyperlink to the note object, whereas the division name alerts an enabled client 140 to provide additional functionalities instead of or in addition to the hyperlink to the note object.

CODE 1:

```
<body>
    <div id = "Message">
        <p>Hey Team,</p>
        <p>Attached are the meeting notes for our planning
        meeting.</p>
    </div>
    <div id = "KeyValue">
        <a href=NoteServer.com/redir.aspx?cid=NoteObject>
        <img src="NoteServer.com/NoteImage.gif" alt="Notes" />
        <p>Notes</p>
        </a>
    </div>
</body>
```

When parsing the body section, the enabled client 140 is triggered by the key value in the division identifier (shown in CODE 1 as "KeyValue") to provide additional functionalities, such as, for example, calling the note extension 150, to provide the additional functionalities of the note application 170 within the enabled client 140 to access the note object. Conversely, the legacy client 130 will parse the key value as the identifier for the division (i.e., div id) and interpret the rest of the division as HTML instructions. Although shown as a key value of "KeyValue" in a division name, and with plaintext references to the note object and image from the note server 160, these values are given as non-limiting examples, and various values for the KeyValue and references may be used, including encrypted versions of the values. To decrypt encrypted values, the recipient may use an access token (e.g., received from a directory server to log in the recipient) to locally decrypt a candidate key value or Uniform Resource Locator (URL) or initiate a handshake procedure with the note server 160 to request access for the recipient to the note object. For example, candidates for key values (e.g., division names) are decrypted, and the result is compared to a known list of key values to determine whether to call a note extension 150.

The organizing user, at the time of meeting creation or an update, may request a new document (of a particular type) to be provided, or a new division of an existing document to be provided. For example, many note taking and spreadsheet applications allow for new "canvases" or "workbooks" to be included as divisions in a document, and many presentation, word processing, an audio/video recording applications allow for breaks (e.g., new slides, pages, chapter markers) to be placed into their documents. An originating user is therefore enabled to choose whether a new document is to be instantiated, a new division is to be instantiated for the meeting for an existing document, or an existing division of an existing document is to be used. For example, a first recurring meeting (e.g., a monthly human resources meeting) may use new divisions for each recurrence (e.g., a January division, a February division, etc.) of a document shared across the recurrences, while a second recurring meeting (e.g., a daily production goals meeting) may access the same document for every recurrence of that meeting (e.g., a shift planning document).

In some aspects, where a new document or division is requested, the meeting request 120 is transmitted to the note server 160 from the meeting originator 110 to instantiate the note object for access by the meeting participants. In other aspects, where a new document or division is requested, the note object is not instantiated until a participant attempts to access the note object. In some aspects, the properties of the note object (e.g., file type, file name, template/layout, retention period, security context) to be instantiated are transmitted to the note server via query values in the URL.

The note object may be retained for a set period of time or indefinitely depending on the retention properties set by the originating user. For example, a document may be retained on the note server 160 until it is manually deleted by a user, or may be deleted (or archived) in response to a storage space limit being reached or a period of time elapsing since the meeting associated with the note object (e.g., m months after the meeting). In various aspects, users may access the note server 160 independently of an email and calendaring application to view or manipulate the note object (e.g., to review meeting notes, delete the note object, move the note object to a new location) or may access the note object via an email and calendaring application and may manipulate the note object in concert with the associated meeting object (e.g., deleting the meeting object deletes the note object).

The note extension 150 may be one of several APIs (Application Program Interfaces) or modules used to access different document types and incorporate functionalities of various note applications 170 into the enabled client 140. The note extension 150 may be provided by a developer of the note application 170 or a third party, and a given user may opt into (or out of) extending the functionality of an email and calendaring application via a plurality of note extensions 150 that are installed to operate with the enabled client 140. The note extension 150 is referenced by the enabled client 140, not duplicated in its code, which allows for changes in functionality via the note extension 150 to not affect the synchronization, data storage, and other components of the enabled client 150, thereby removing those components as security concerns for sharing/granting unauthorized access to the note object. Additionally, the note extension 150 may require additional security contexts (e.g., trusted senders/participants, disabled macros) to access the note object in the enabled client 140. The separately provided note extension 150 decouples the feature implementation from the mail and calendaring application, and allows existing clients to surface additional functionalities without exposing data to an extension. For example, a collaborative note-taking experience can be added to a meeting item without requiring the email and calendaring application to be concerned or even have access to, the note object contained within a separate note-taking application.

The note application 170, which may be a locally run on a computing device accessing the meeting item or accessed as a remotely provided "cloud" service, is used to access the note object when the participant used a legacy client 130 to access the meeting item. In some aspects, the note extension 150 communicates with a note application 170 to provide extended functionalities within the enabled client 140, while in other aspects, the note extension 150 provides the functionalities of a note application 170 within the enabled client 140 without requiring access a note application 170.

Figure 2A:
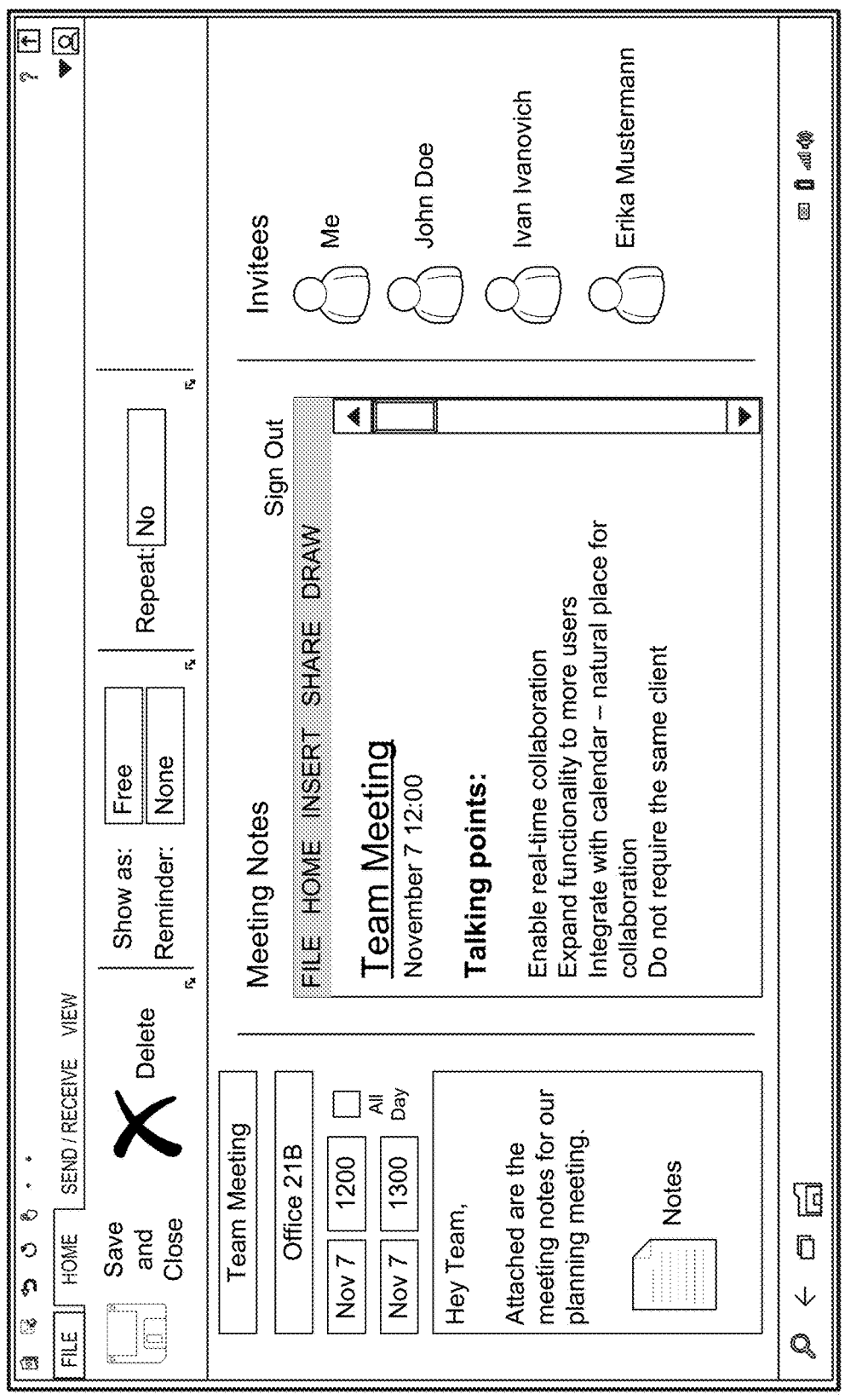
FIGS. 2A-2C are example user interfaces illustrating aspects of the present disclosure.
Figure 2B:
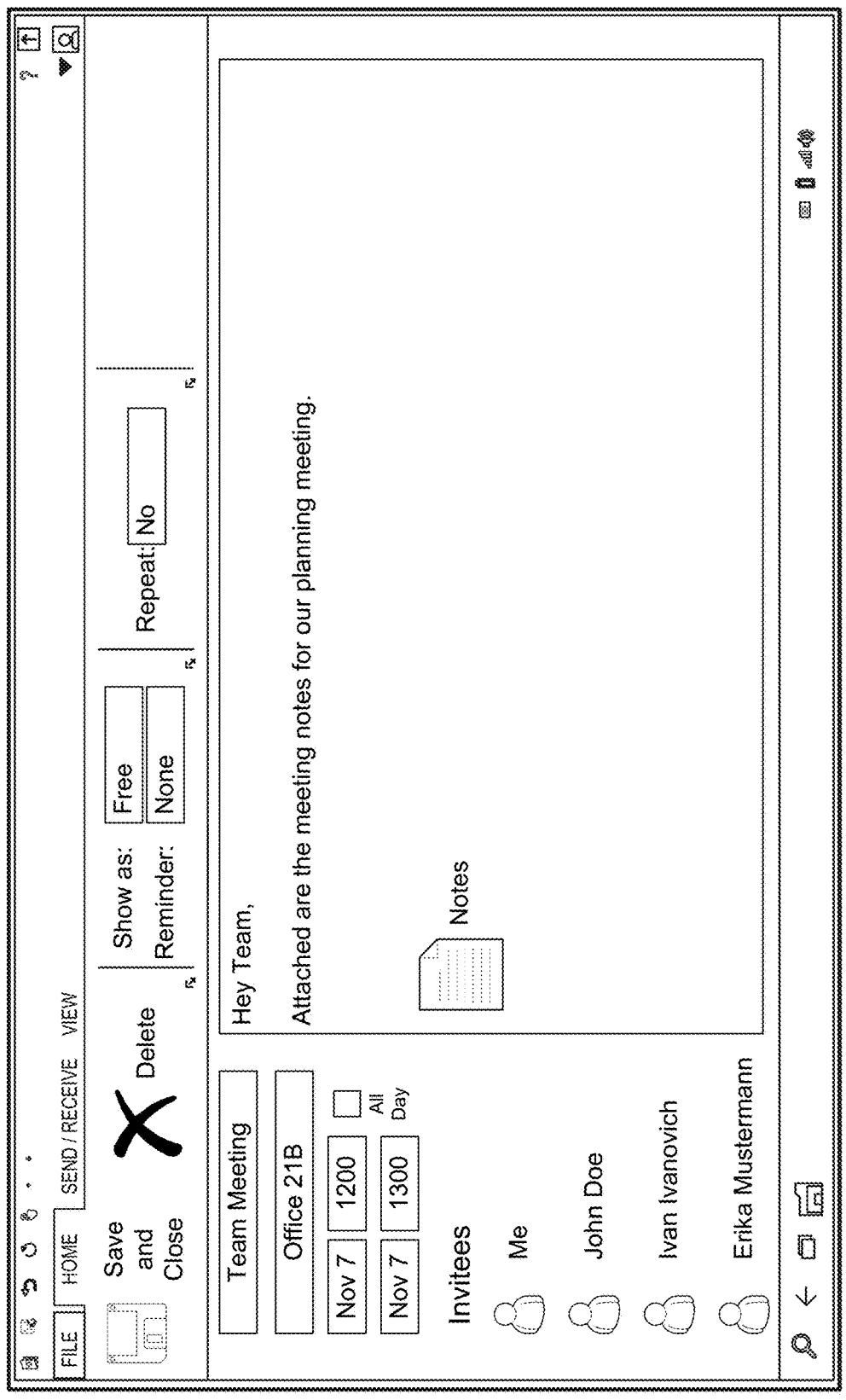
Figure 2C:
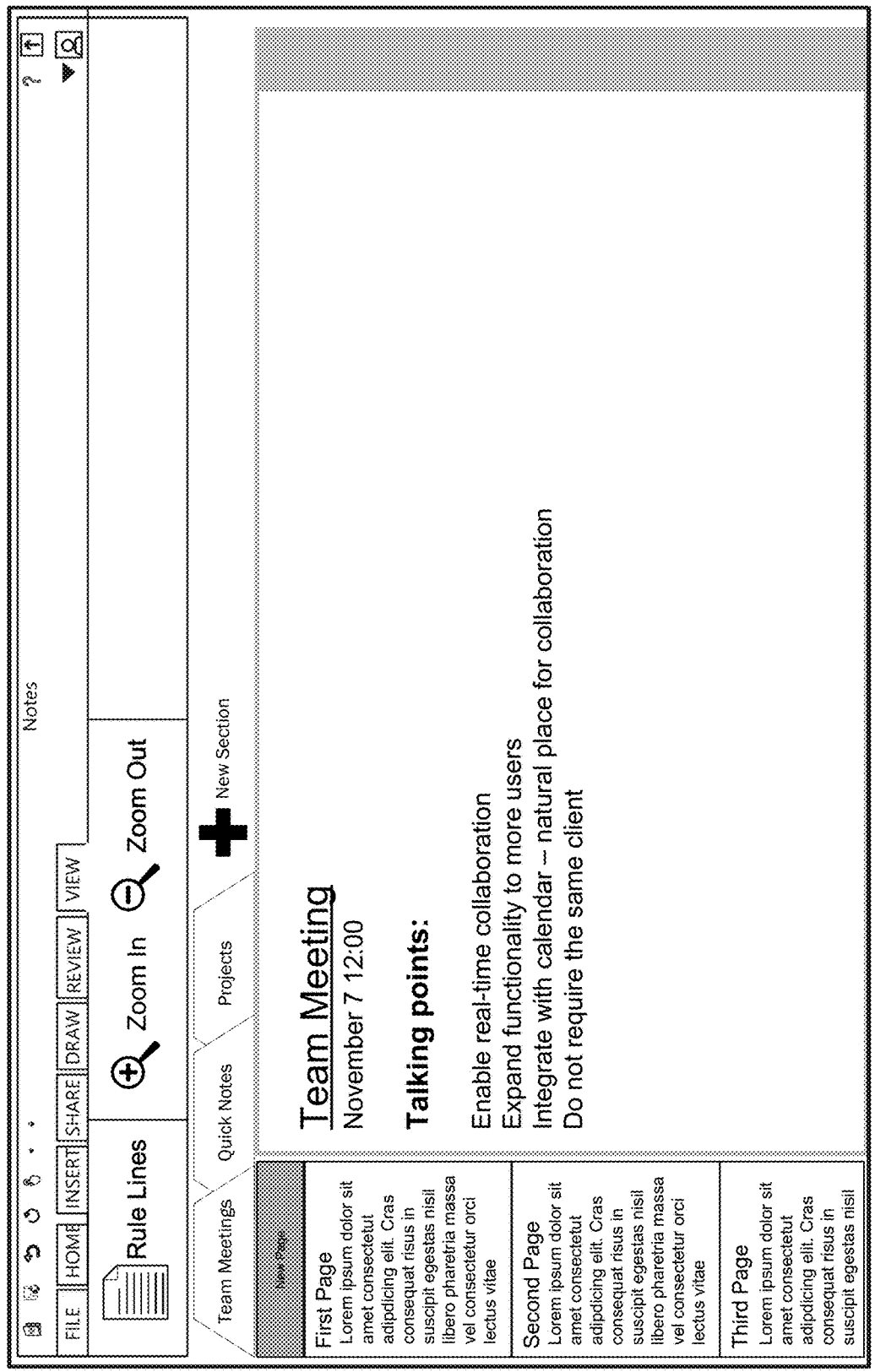

FIGS. 2A-2C are example user interfaces (UI). FIG. 2A shows an example UI 201 of an email and calendaring application (e.g., an enabled client 140) displaying a meeting item and an associated note object via the email and calendaring application. FIG. 2B shows an example UI 202 of an email and calendaring application (e.g., a legacy client 130 or enabled client 140 with disabled functionalities) displaying a meeting item and a hyperlink to the associated note object. FIG. 2C shows an example UI 203 of an authoring application (e.g., note application 170) for note taking displaying the note object accessible via the hyperlink. As will be appreciated, the example UI 201 and the example UI 202 display the same body information (as is described in the Message division of CODE 1), but example UI 201 also displays the note object shown in FIG. 2C and provides the functionality of example UI 203 of the authoring application within the email and calendaring application to enable meeting participants to collaborate within their respective email and calendaring applications when they are enabled clients 140. The embedded functionalities of the authoring application shown in example UI 201 may include all or a portion of the functionalities available in example UI 203, and may incorporate additional functionalities of the email and calendaring application.

In various aspects, if the meeting originator 110 did not embed the note object into the meeting request 120, for example, merely attaching a note document or a hyperlink to access a note document, an enabled client 140 may display the meeting request 120 as is shown in example UI 202 or automatically provide access to the attached/linked note document as is shown in example UI 201.

Figure 3:
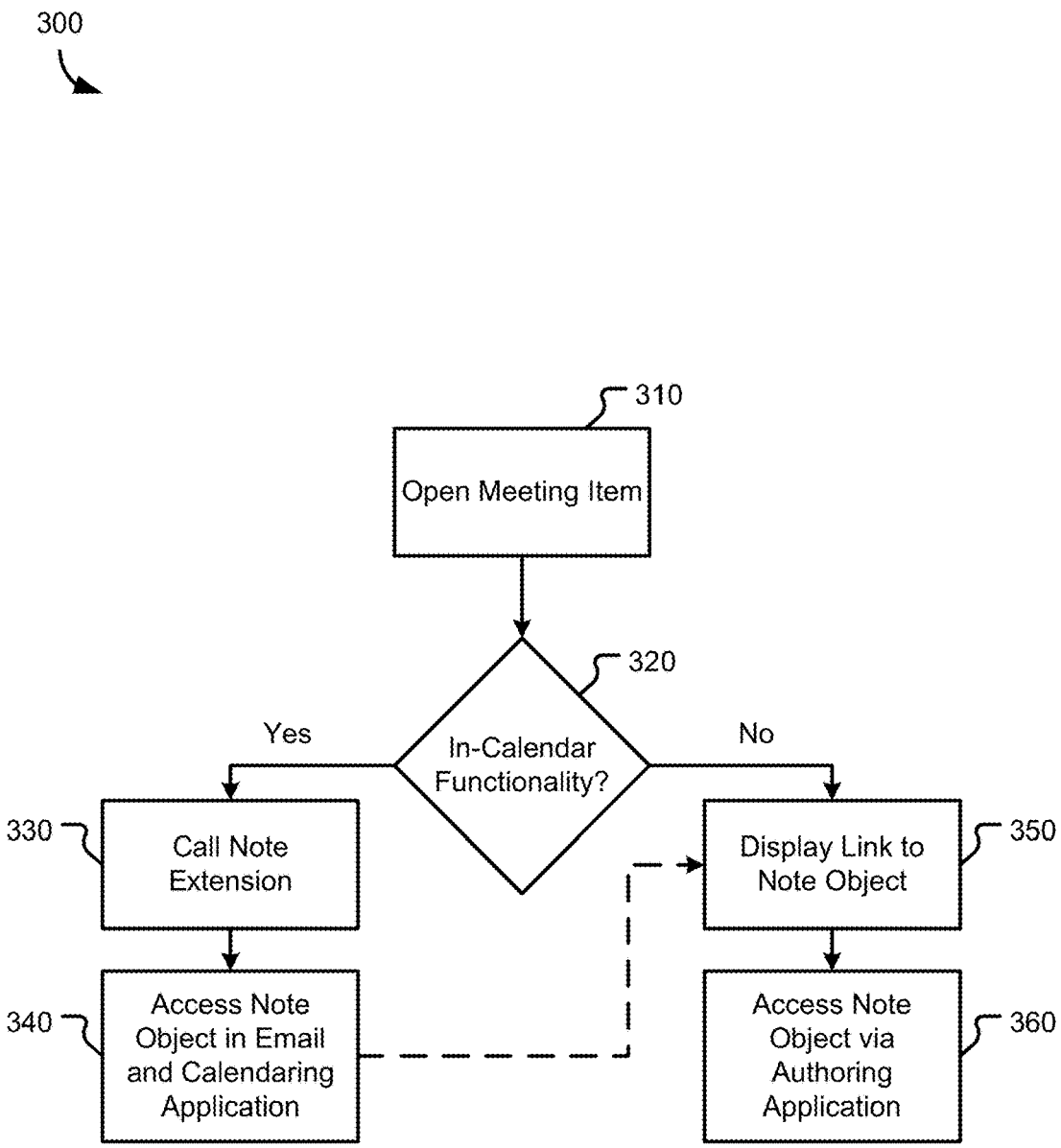
FIG. 3 is a flow chart showing general stages involved in an example method for interchangeably providing access to extended functionalities for meeting items in enabled clients.

FIG. 3 is a flow chart showing general stages involved in an example method 300 for interchangeably providing access to extended functionalities for meeting items in enabled clients 140 without interfering with interpretation of the meeting items in legacy clients 130. Method 300 begins with OPERATION 310, where a meeting item is opened by a client, wherein the meeting request 120 for the meeting item includes an embedded note object. The meeting originator 110, when sending the meeting request 120, embeds the note object into the body field of the meeting request 120, which may include other text describing the meeting item in the body field as well as other fields describing other aspects of the meeting item. In another example, the note object may be included within its own property in accordance with another standard. The meeting item is opened in response to a participant accessing the meeting request 120 in an email and calendaring application, syncing a device with an email and calendaring service, or accepting a meeting invitation.

Method 300 proceeds to DECISION 320 to determine whether in-calendar functionality is enabled for the client. The body field, in which the note object is embedded, is parsed to identify whether recognizable key values are present to thereby trigger provision of additional functionalities. In response to detecting a recognizable key value, method 300 proceeds to OPERATIONS 330 and 340 to display the meeting request 120 with additional functionality enabled. If no recognizable key value is identified (and in some aspects where a key value is identified), method 300 proceeds to OPERATIONS 350 and 360, where the contents of the body field, as well as the contents of other fields of the meeting request 120 (e.g., title, start/end times, participants, recurrence) are displayed according to the layout of the email and calendaring application client.

At OPERATION 330 the note extension 150 is called in response to detecting the key value in the body section of the meeting request 120. The note extension 150 parses the information needed to access (or instantiate) the note object from the note server 160 and provides the functionality of an authoring application within the client to access the note object therein in OPERATION 340. The note extension 150 enables the recipient to establish an authoring session with the note server 160, receive content within the note object, add content (via the UI of the enabled client 140) to the note object, and receive updates to the content from coauthors.

Method 300 optionally proceeds to OPERATION 350 in addition to OPERATIONS 330 and 340.

At OPERATION 350 a hyperlink to the note object is displayed in the UI of the mail and calendaring application within a field or window associated with the body field of a meeting request 120. The hyperlink is displayed according to the formatting of the body field (e.g., as HTML described text, images, and hypertext) such that legacy clients 130 and enabled clients 140 may both display the hyperlink to the note object. In various aspects, actuating the hyperlink (e.g., by clicking on the hyperlink in the UI of the mail and calendaring application) will enable the mail and calendaring application to download the note object to the user's device and/or proceed to OPERATION 360 to call a note application 170 to access the note object.

Figure 4:
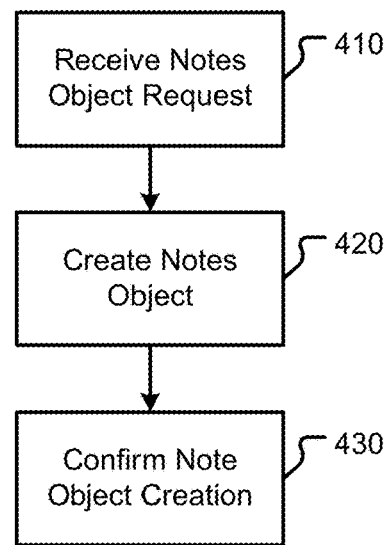
FIG. 4 is a flow chart showing general stages involved in an example method for hosting a note object by a note server for provision to enabled clients.

FIG. 4 is a flow chart showing general stages involved in an example method 400 for hosting a note object by a note server 160 for provision to enabled clients 140. Method 400 begins with OPERATION 410, where a note object request is received by the note server 160. In some aspects, the note object request is received from a meeting originator 110 in response to transmitting a meeting request 120 to one or more recipients. In other aspects, the note object request is received from a recipient (or originator) of the meeting request 120 in response to a first attempt to access the note object.

Proceeding to OPERATION 420, the note server 160 creates the note object. The note object is created according to instructions passed to the note server 160 in the note object request. A URL for the note object is embedded in a body field of the meeting request 120 and the URL includes the instructions regarding how the meeting object is to be created, for example as values to query fields in the URL. Depending on the instructions present in the URL, the note server 160 will create a new note document with a given title, file format, and characteristics or will create a new section (e.g., page, sheet, chapter division) of an existing note document as specified in the URL. In various aspects, the note server 160 will apply security features to the note document so that, for example, only users associated with the meeting request 120 (e.g., those specified as participants) may access the note object or a given security clearance is required of users to access the note document, which may be correlated with a directory server or access token to satisfy the required security contexts.

At OPERATION 430 the note server 160 confirms creation of the note object. In aspects where the note object is created in response to a meeting originator 110 creating a meeting item, the confirmation may include the note server 160 responding to the meeting request 120 (e.g., "accepting" the meeting request 120) or generating a confirmation message, which is sent to the meeting originator 110 (e.g., as an email message). In further aspects, an authoring session for the meeting originator 110 (in a calendaring client or a note application 170) is established to enable the originating user to input content to initialize the note object. In aspects where the note object is created in response to a participant of the meeting item attempting to access the note object, the confirmation may include initiating an authoring session with the participant.

An authoring session includes authenticating the participant and providing an enabled client 140 or note application 170 the content of the note object and receiving authored content from the participant for incorporation into the note object. As will be appreciated, several participants may establish authoring sessions contemporaneously (i.e., a coauthoring session) using different enabled clients 140 and/or authoring applications 170. For example, a first participant using calendar client X may be a coauthor with a second participant using calendar client Y and a third participant using word processor Z.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
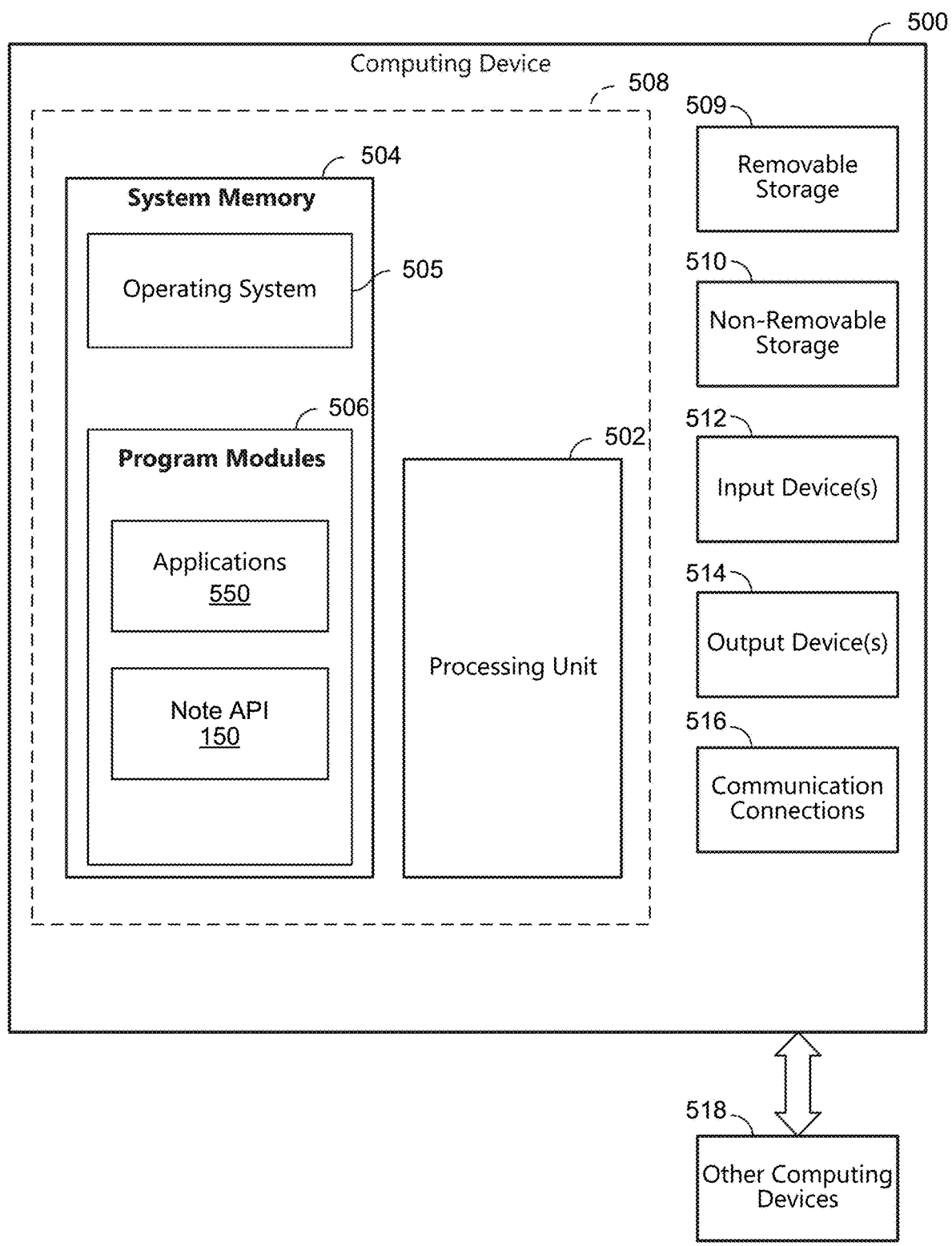
FIG. 5 is a block diagram illustrating example physical components of a computing device.
Figure 6A:
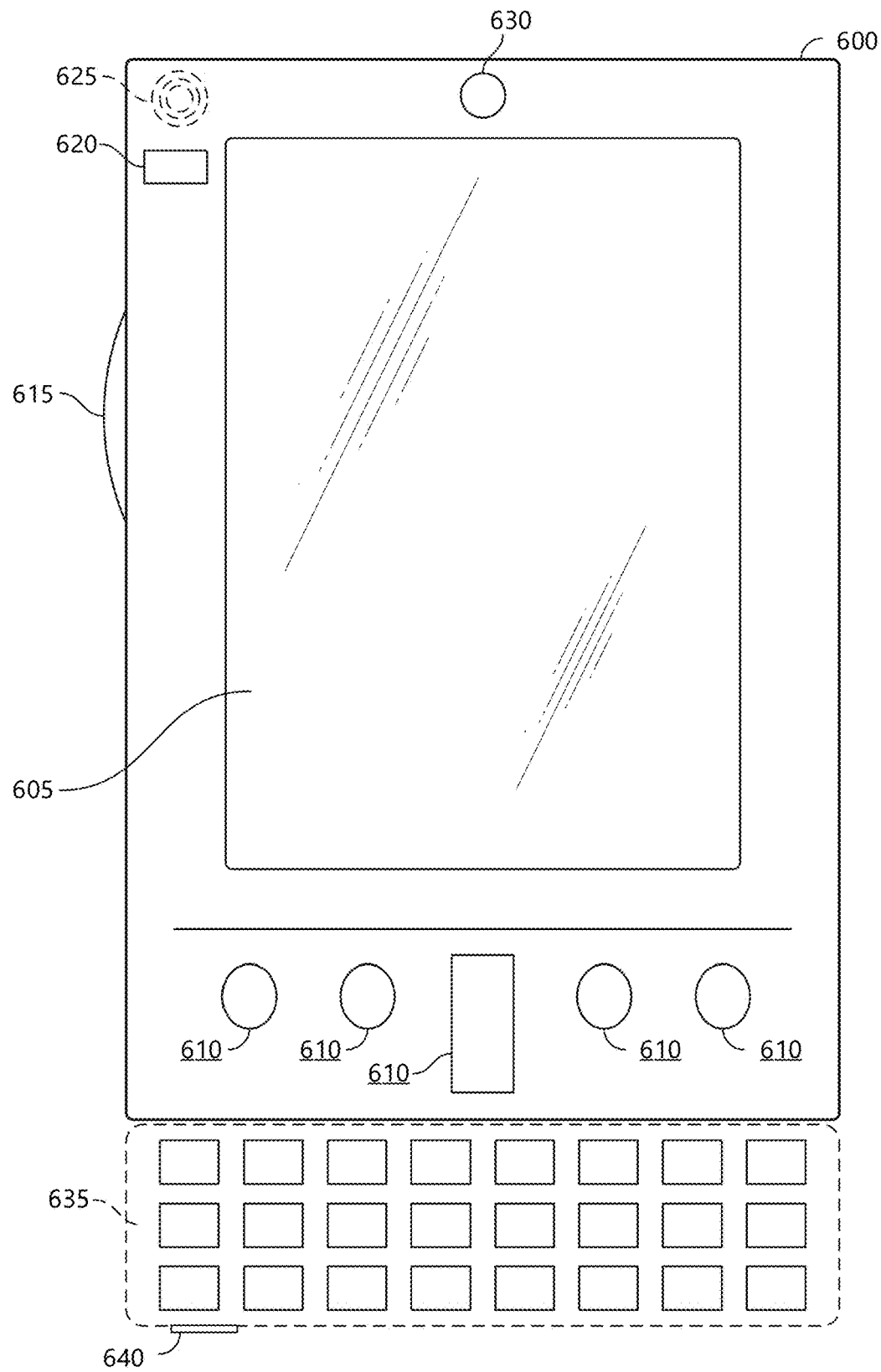
FIGS. 6A and 6B are block diagrams of a mobile computing device.
Figure 6B:
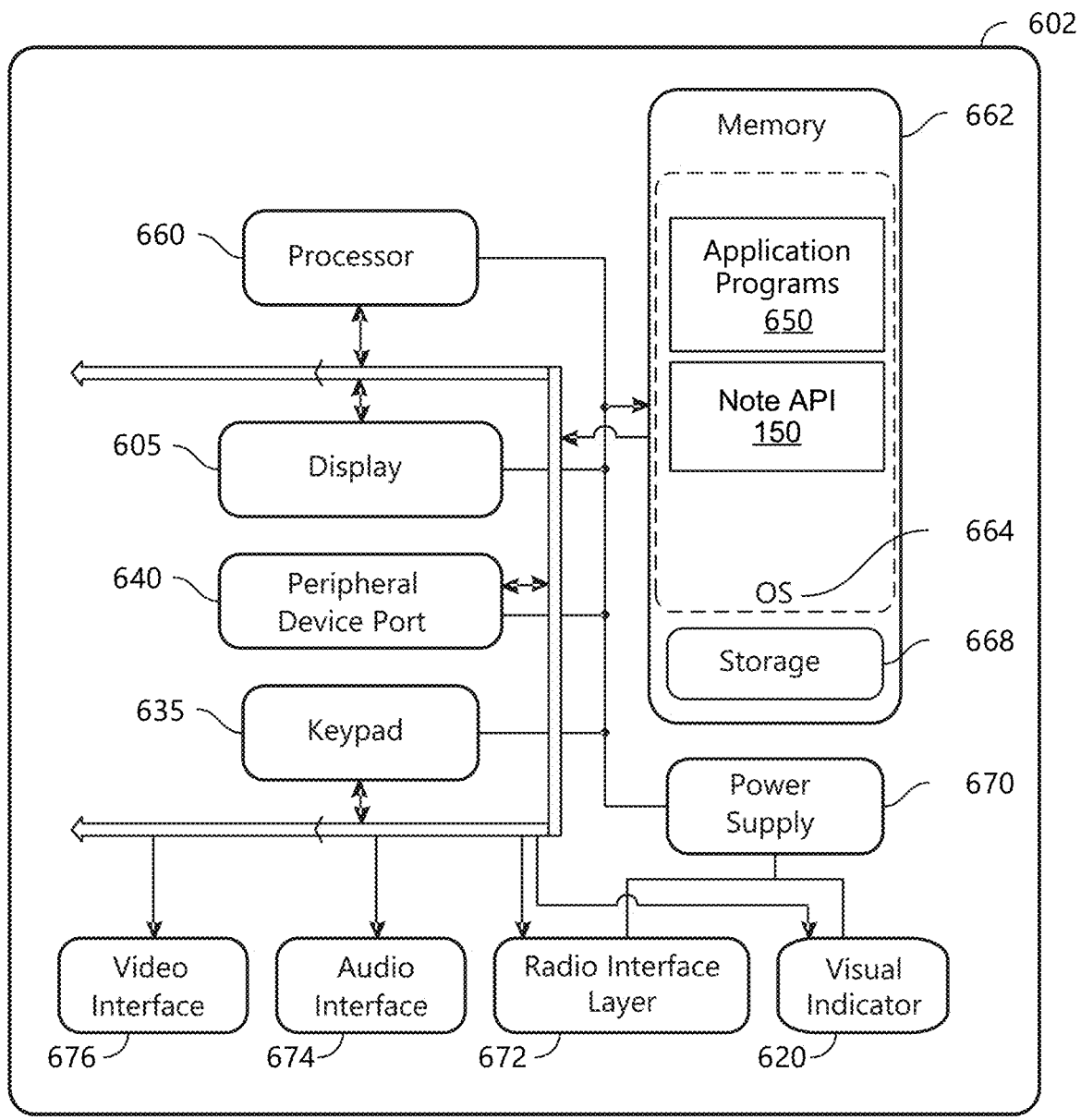
Figure 7:
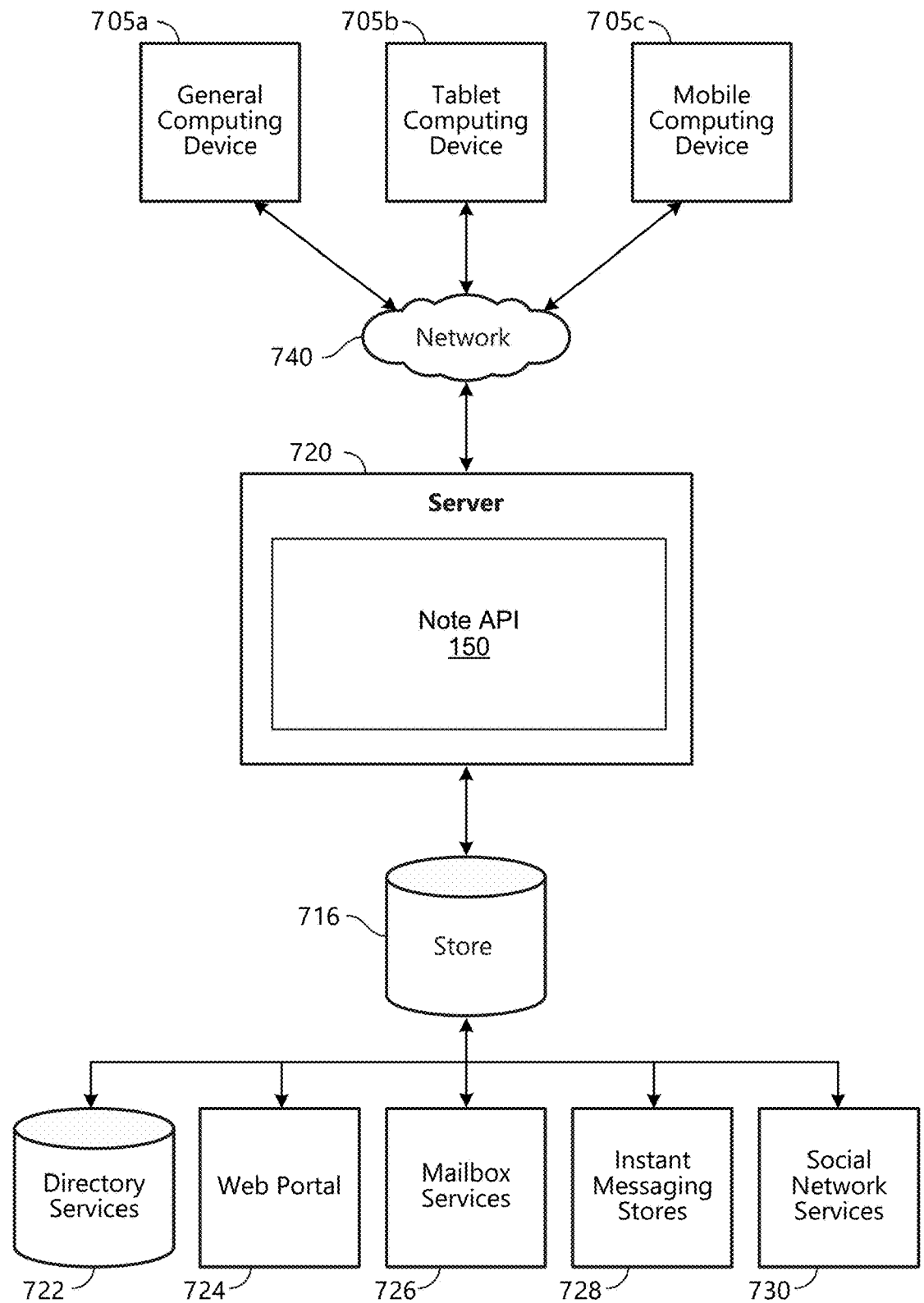
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes note extension 150. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., note extension 150) perform processes including, but not limited to, one or more of the stages of the methods 300 and 400 illustrated in FIGS. 3 and 4, respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media are part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, note extension 150 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for interchangeably providing access to extended functionalities for meeting items as described above. Content developed, interacted with, or edited in association with the note extension 150 is enabled to be stored in different communication channels or other storage types. For example, various documents may be stored using a directory service 722, a web portal 724, a mailbox service 726, an instant messaging store 728, or a social networking site 730. The note extension 150 is operative to use any of these types of systems or the like for interchangeably providing access to extended functionalities for meeting items, as described herein. According to an aspect, a server 720 provides the note extension 150 to clients 705a,b,c. As one example, the server 720 is a web server providing the note extension 150 over the web. The server 720 provides the note extension 150 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for interchangeably providing access to extended functionalities for meeting items, comprising:
    receiving, at a calendaring application, a meeting item comprising an embedded content object associated with an authoring application;
    in response to the meeting item being opened in the calendaring application, parsing the meeting item;
    identifying, from the parsing of the meeting item, a trigger for the calendaring application to provide additional functionalities of the authoring application;

calling an extension to provide the additional functionalities of the authoring application within the calendaring application; and accessing, within a user interface of the calendaring application, the content object embedded in the meeting item via the extension.

2. The method of claim 1, wherein accessing the content object further comprises:
transmitting an access request to a server associated with the authoring application to instantiate the content object; and
receiving the content object from the server.

3. The method of claim 2, wherein transmitting the access request to the server further comprises:
authenticating access to the content object; and
establishing an authoring session for the content object on the server.

4. The method of claim 2, further comprising:
displaying the content object received from the server in the user interface of the calendaring application.

5. The method of claim 2, further comprising:
authoring content in the content object via the user interface of the calendaring application; and
transmitting the authored content to the server.

6. The method of claim 1, further comprising:
syncing the calendaring application with a calendar service including the meeting item in response to the meeting being opened in the calendaring application.

7. The method of claim 1, wherein the trigger is a key value identified in the parsed meeting item, and calling the extension comprises:
calling a particular extension indicated by the key value, wherein the particular extension is configured to provide authoring functionalities for a document type of the content object.

8. The method of claim 7, wherein the document type of the content object is one of:
a word processing document;
a spreadsheet document;
a presentation document; and
a note taking document.

9. The method of claim 1, wherein the trigger is a key value identified in the parsed meeting item, and identifying the key value in the parsed meeting item further comprises:
determining the key value is encrypted; and
decrypting the key value.

10. The method of claim 1, wherein the trigger is a key value that is included in the meeting item received at the calendaring application, and identifying the trigger is based on the calendaring application having a first configuration that recognizes the key value.

11. The method of claim 10, wherein another calendaring application has a second configuration that is different from the first configuration, and the method further comprises:
receiving, at the other calendaring application, the meeting item comprising the embedded content object associated with the authoring application;
in response to the meeting item being opened in the other calendaring application, parsing the meeting item;
failing to identify, from the parsing of the meeting item, the trigger based on the second configuration of the other calendaring application failing to recognize the key value; and
providing a hyperlink in the meeting item to access the content object embedded in the meeting item within a user interface of the authoring application.

12. The method of claim 1, wherein accessing, within the user interface of the calendaring application, the content object embedded in the meeting item via the extension comprises:
enabling authoring of content in the accessed content object within the user interface of the calendaring application via the extension.

13. A system for interchangeably providing access to extended functionalities for meeting items, comprising:
a processor; and
a computer readable storage device coupled to the processor and including executable instructions, wherein the executable instructions, when executed by the processor, are operable to:
receive, at a calendaring application, a meeting item comprising an embedded content object associated with an authoring application;
in response to the meeting item being opened in the calendaring application, parse the meeting item;
identify, from the parse of the meeting item, a key value, wherein the identification of the key value is a trigger for the calendaring application to provide additional functionalities of the authoring application; and
responsive to the identification of the key value:
call an extension to provide the additional functionalities of the authoring application within the calendaring application; and
access, within a user interface of the calendaring application, the content object embedded in the meeting item via the extension.

14. The system of claim 13, wherein to access the content object, the executable instructions, when executed by the processor, are operable to:
transmit a request for the content object to a server associated with the authoring application.

15. The system of claim 14, wherein the content object is created by the server based on instructions in the request, the instructions in a form of a URL embedded in the meeting item.

16. The system of claim 14, wherein an authoring session for the content object within the calendaring application is established by the server.

17. The system of claim 16, wherein once the authoring session has been established, the executable instructions, when executed by the processor, are further operable to:
receive the content object from the server; and
display the content object in the user interface of the calendaring application.

18. The system of claim 14, wherein the executable instructions, when executed by the processor, are further operable to:
author content in the content object via the user interface of the calendaring application; and
transmit the authored content to the server.

19. The system of claim 14, wherein the executable instructions, when executed by the processor, are further operable to:
receive updates to the content object made by one or more other co-authors of the content object from the server.

20. A computer readable storage device including processor executable instructions for interchangeably providing access to extended functionalities for meeting items, comprising:
in response to a meeting item with an embedded content object being opened in a calendaring application, parsing the meeting item;

determining, from the parsing of the meeting item, whether the meeting item includes a key value, wherein a recognition of the key value identifies that the calendaring application provides additional functionalities of an authoring application;

in response to a determination that the meeting item does not include the key value, providing a hyperlink in the meeting item to access the content object within a user interface of the authoring application; and in response to a determination that the meeting item includes the key value:
  calling an extension to provide the additional functionalities of the authoring application within the calendaring application; and
  accessing, within a user interface of the calendaring application, the content object embedded in the meeting item via the extension.

* * * * *